United States Patent
Yonezawa

(10) Patent No.: US 12,455,499 B2
(45) Date of Patent: Oct. 28, 2025

(54) ACCESSORY, IMAGE PICKUP APPARATUS, IMAGE PICKUP SYSTEM, ACCESSORY CONTROL METHOD, AND STORAGE MEDIUM

(71) Applicant: CANON KABUSHIKI KAISHA, Tokyo (JP)

(72) Inventor: Takeshi Yonezawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 17/967,150

(22) Filed: Oct. 17, 2022

(65) Prior Publication Data

US 2023/0168568 A1   Jun. 1, 2023

(30) Foreign Application Priority Data

Dec. 1, 2021   (JP) .................................. 2021-195249

(51) Int. Cl.
| | | |
|---|---|---|
| G03B 17/56 | (2021.01) | |
| G03B 17/14 | (2021.01) | |
| H04N 23/55 | (2023.01) | |
| H04N 23/663 | (2023.01) | |

(52) U.S. Cl.
CPC .......... *G03B 17/565* (2013.01); *G03B 17/14* (2013.01); *H04N 23/55* (2023.01); *H04N 23/663* (2023.01)

(58) Field of Classification Search
None
See application file for complete search history.

(56) References Cited

U.S. PATENT DOCUMENTS

| | | | | |
|---|---|---|---|---|
| 2008/0240709 | A1* | 10/2008 | Nakamura | H04N 23/60 396/529 |
| 2010/0328480 | A1* | 12/2010 | Kikuchi | H04N 23/633 348/222.1 |
| 2011/0037881 | A1* | 2/2011 | Natsume | H04N 23/663 348/241 |
| 2013/0176480 | A1* | 7/2013 | Makigaki | G03B 13/32 348/361 |
| 2016/0155214 | A1* | 6/2016 | Shirai | G06T 5/20 348/241 |
| 2018/0224722 | A1* | 8/2018 | Pan | G03B 17/565 |
| 2018/0309914 | A1* | 10/2018 | Shigeta | G02B 27/0037 |
| 2020/0007740 | A1* | 1/2020 | Sugita | G03B 17/14 |
| 2020/0193576 | A1* | 6/2020 | Yamada | H04N 25/61 |

FOREIGN PATENT DOCUMENTS

| | | |
|---|---|---|
| JP | 2005217504 A | 8/2005 |
| JP | 2006135805 A | 5/2006 |
| JP | 2012018222 A | 1/2012 |
| WO | 2017068894 A1 | 4/2017 |

* cited by examiner

*Primary Examiner* — Twyler L Haskins
*Assistant Examiner* — Wesley J Chiu
(74) *Attorney, Agent, or Firm* — ROSSI, KIMMS & McDOWELL LLP

(57) ABSTRACT

An accessory attachable to and detachable from an image pickup apparatus includes a memory configured to store first data having a first characteristic for correcting image data obtained by the image pickup apparatus, and second data having a second characteristic different from the first characteristic for correcting image data obtained by the image pickup apparatus, and a communication unit configured to transmit first information based on the first data and second information based on the second data to an external apparatus.

17 Claims, 14 Drawing Sheets

ACCESSORY, IMAGE PICKUP APPARATUS, IMAGE PICKUP SYSTEM, ACCESSORY CONTROL METHOD, AND STORAGE MEDIUM

BACKGROUND

Technical Field

The disclosure relates to an accessory, an image pickup apparatus, an image pickup system, an accessory control method, and a storage medium.

Description of the Related Art

An image (video) captured through an optical system often has deterioration caused by the optical system. The image deterioration caused by the optical system is correctable by using an image pickup apparatus or an image processing apparatus.

Japanese Patent Laid-Open No. ("JP") 2006-135805 discloses an apparatus that performs image processing for correcting the image deterioration caused by chromatic aberration of an optical system. JP 2005-217504 discloses an imaging (image pickup) system having a function of correcting a drop in peripheral light quantity by amplifying an image signal.

The above correction data needs to generate a corrected image that does not give a sense of discomfort under various imaging conditions. On the other hand, since the correction data for generating the corrected image that does not give the sense of discomfort under various imaging conditions includes components other than the components relating to the optical system, a desired image may not be obtained depending on the situation or application.

SUMMARY

The disclosure provides, for example, an accessory beneficial in obtaining a desired image.

An accessory attachable to and detachable from an image pickup apparatus according to one aspect of the disclosure includes a memory configured to store first data having a first characteristic for correcting image data obtained by the image pickup apparatus, and second data having a second characteristic different from the first characteristic for correcting image data obtained by the image pickup apparatus, and a communication unit configured to transmit first information based on the first data and second information based on the second data to an external apparatus.

An image pickup apparatus to which an accessory is detachably attached according to another aspect of the disclosure includes an image pickup element, a communication unit configured to receive, from the accessory, first information having a first characteristic for correcting image data obtained by the image pickup element, and second information having a second characteristic different from the first characteristic for correcting image data obtained by the image pickup element, and a correction unit configured to correct image data obtained by the image pickup element based on at least one of the first information and the second information.

An image pickup system including the above accessory, a control method of the above accessory, and a storage medium storing a program that causes a computer to execute the above control method also constitute another aspect of the disclosure.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

First Embodiment

Figure 1:
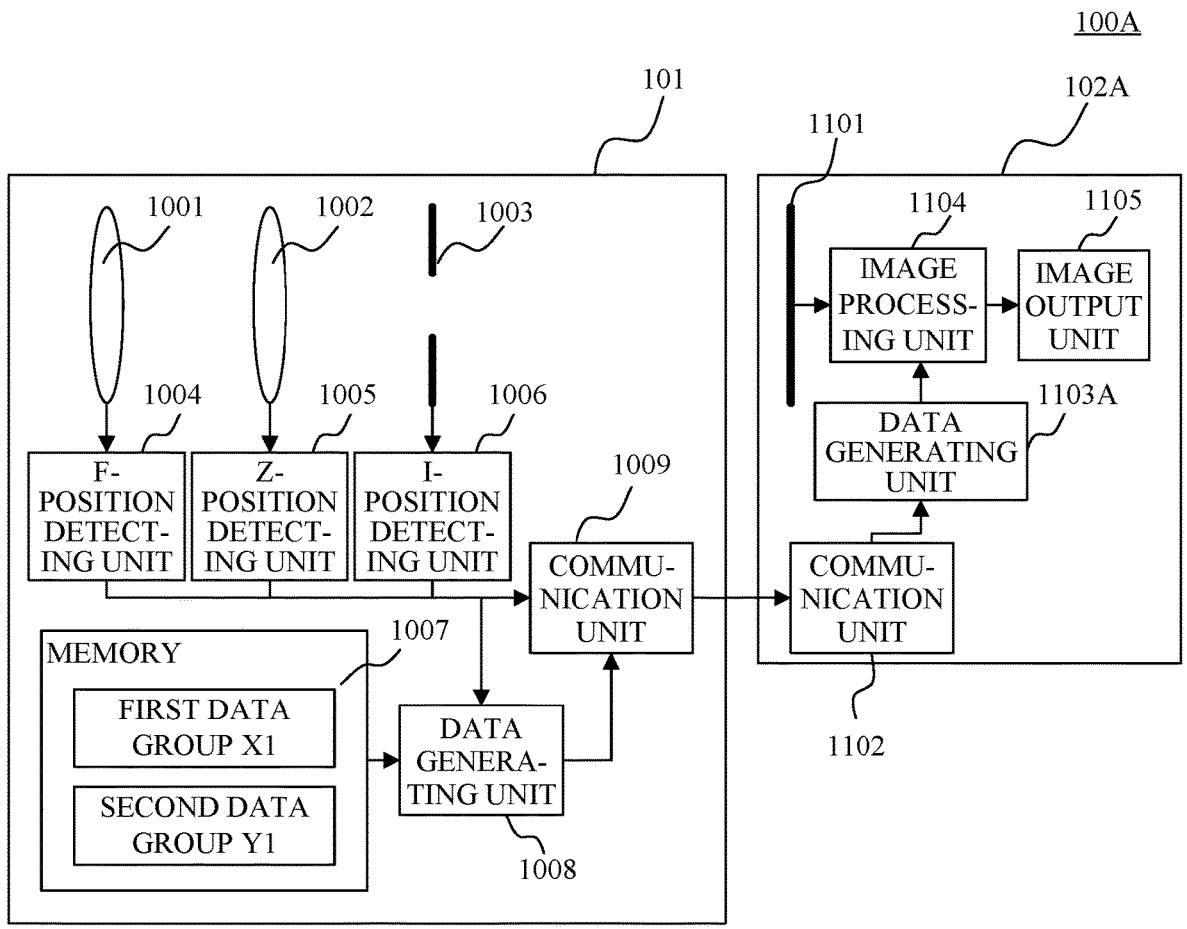
FIG. 1 is a block diagram of an imaging (image pickup) system according to a first embodiment.
Figure 2:
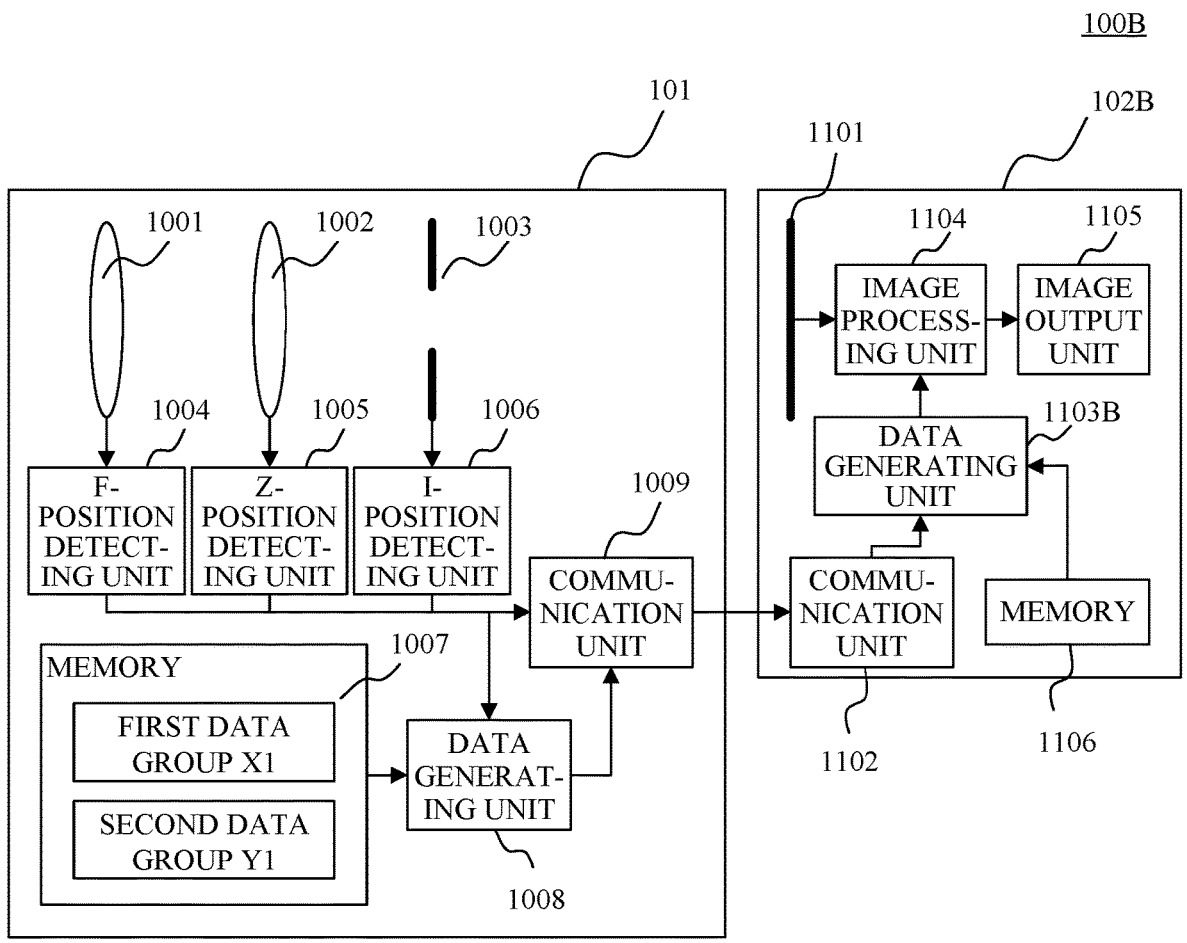
FIG. 2 is a block diagram of the imaging system according to the first embodiment.

Referring now to FIGS. 1 and 2, a description will be given of an imaging (image pickup) system that includes an accessory according to a first embodiment of the disclosure. In this embodiment, the accessory is a lens apparatus attachable to and detachable from the image pickup apparatus. FIG. 1 is a block diagram of an imaging system 100A. FIG. 2 is a block diagram of an imaging system 100B.

The imaging system 100A illustrated in FIG. 1 includes an image pickup apparatus 102A and a lens apparatus 101 attachable to and detachable from the image pickup apparatus 102A. The image pickup apparatus 102A performs optical correction using correction data (or datum) 2 as it is output from a communication unit 1009 of the lens apparatus 101.

The lens apparatus 101 is attachable to and detachable from the image pickup apparatus 102A, forms an optical image (object image) via an imaging optical system that includes a focus lens 1001, a zoom lens 1002, and an aperture stop (diaphragm) 1003, and images it on an image sensor 1101 in the image pickup apparatus 102A. An F-position detecting unit 1004, a Z-position detecting unit 1005, and an I-position detecting unit 1006 are detection units, such as potentiometers and encoders, configured to detect positions (positions of optical elements) of the focus lens 1001, the zoom lens 1002, and the aperture stop 1003.

A memory 1007 is a storage unit for storing data, and stores a first data group X1 (also referred to as first data X1) and a second data group Y1 (also referred to as second data Y1). The first data group X1 is a data group having a first characteristic for correcting image data acquired by the image pickup apparatus, and the second data group Y1 is a data group having a second characteristic for correcting the image data acquired by the image pickup apparatus. The memory 1007 may be either a ROM (internal memory) inside a CPU or an external memory different from the CPU. The details of the first data group X1 and the second data group Y1 will be described below.

A data generating unit 1008 generates correction data to be notified to the image pickup apparatus 102A based on the data stored in the memory 1007 and the detected positions (positions of the optical elements) detected by the F-position detecting unit 1004, the Z-position detecting unit 1005, and the I-position detecting unit 1006. The details of the data generating unit 1008 will be described below. The communication unit 1009 transmits and receives information to and from the image pickup apparatus 102A. In this embodiment, the communication unit 1009 transmits the detected positions detected by the F-position detecting unit 1004, the Z-position detecting unit 1005, and the I-position detecting unit 1006. The communication unit 1009 transmits the correction data (first data (first information), second data (second information)) generated by the data generating unit (information generating unit) 1008.

Here, the correction data includes the first data based on the first data group X1 (first information based on the first data X1) and the second data based on the second data group Y1 (second information based on the second data Y1). The first data (first information) is data relating to the optical characteristic of the lens apparatus 101 as an accessory. The second data (second information) is data for correcting an image captured by the image pickup apparatus 102A (image data acquired by the image pickup apparatus 102A). That is, the first characteristic corresponds to the optical characteristic of the accessory (lens apparatus), and the second characteristic corresponds to a characteristic acquired by combining the optical characteristic of the accessory (lens apparatus) and the characteristic of the image pickup apparatus.

The communication unit 1009 transmits the first data and the second data in the same data format. The common data format can provide high-speed processing. The communication unit 1009 can independently transmit only one of the first data and the second data according to a request from the image pickup apparatus. Alternatively, the communication unit 1009 may transmit both the first data and the second data as a set (for example, by serial communication) according to a request from the image pickup apparatus. The communication unit 1009 can transmit the first data (first information) and the second data (second information) to the image pickup apparatus, but may transmit them to an external apparatus (an apparatus other than the image pickup apparatus, a cloud computer, etc.).

The image pickup apparatus 102A corrects a peripheral light quantity (optical correction) for an image captured by the image sensor 1101 using the correction data output from the communication unit 1009 of the lens apparatus 101. A communication unit 1102 communicates the correction data and the like with the communication unit 1009 of the lens apparatus 101. That is, the communication unit 1102 can receive the first data having the first characteristic and the second data having the second characteristic for the optical correction from the lens apparatus 101.

A data generating unit 1103A requests correction data 2 (second data) via the communication unit 1102, and generates data for the peripheral light quantity correction based on the correction data 2. In this embodiment, the correction data 2 received by the communication unit 1102 is output as it is. The correction data 2 is generated and output by the data generating unit 1008 based on the second data group Y1 stored in the memory 1007 in the lens apparatus 101. The details of the generation of the correction data 2 in the lens apparatus 101 will be described below. An image processing unit (correction unit) 1104 corrects the peripheral light quantity based on the correction data generated by the data generating unit 1103A. That is, the image processing unit 1104 uses the first data or the second data to perform optical correction for the image data from the image sensor 1101. An image output unit 1105 outputs an image generated by the image processing unit 1104, such as a Standard Definition (SD) card and a High-Definition Multimedia Interface (HDMI) output terminal.

Referring now to FIG. 2, a description will be given of the imaging system 100B connected to the image pickup apparatus 102B that generates new correction data based on the characteristic of the image pickup apparatus based on the correction data output from the communication unit 1009 of the lens apparatus 101. Since the lens apparatus 101 in FIG. 2 is the same as the lens apparatus 101 in FIG. 1, a description thereof will be omitted.

The image pickup apparatus 102B illustrated in FIG. 2 generates new correction data based on the characteristic of the image pickup apparatus 102B and corrects a peripheral light quantity (optical correction) using the correction data output from the communication unit 1009 of the lens apparatus 101 for an image captured by the image sensor 1101. Since the communication unit 1102, the image processing unit 1104, and the image output unit 1105 of the image pickup apparatus 102B are the same those of the image pickup apparatus 102A, a description thereof will be omitted.

A memory 1106 is a storage unit that stores a characteristic relating to a peripheral light quantity of the image pickup apparatus 102B. Here, the characteristic of the image pickup apparatus includes, for example, the characteristic of the image sensor, but the characteristic is not limited to this example. A data generating unit 1103B requests correction data 1 (first data) via the communication unit 1102, and generates correction data 1' for correcting the peripheral light quantity based on the correction data 1 and the camera-side characteristic stored in the memory 1106. The correction data 1 is generated and output by the data generating unit 1008 based on the first data group X1 stored in the memory 1007 in the lens apparatus 101. The details of the generation of the correction data 1 in the lens apparatus 101 will be described below.

Figure 3:
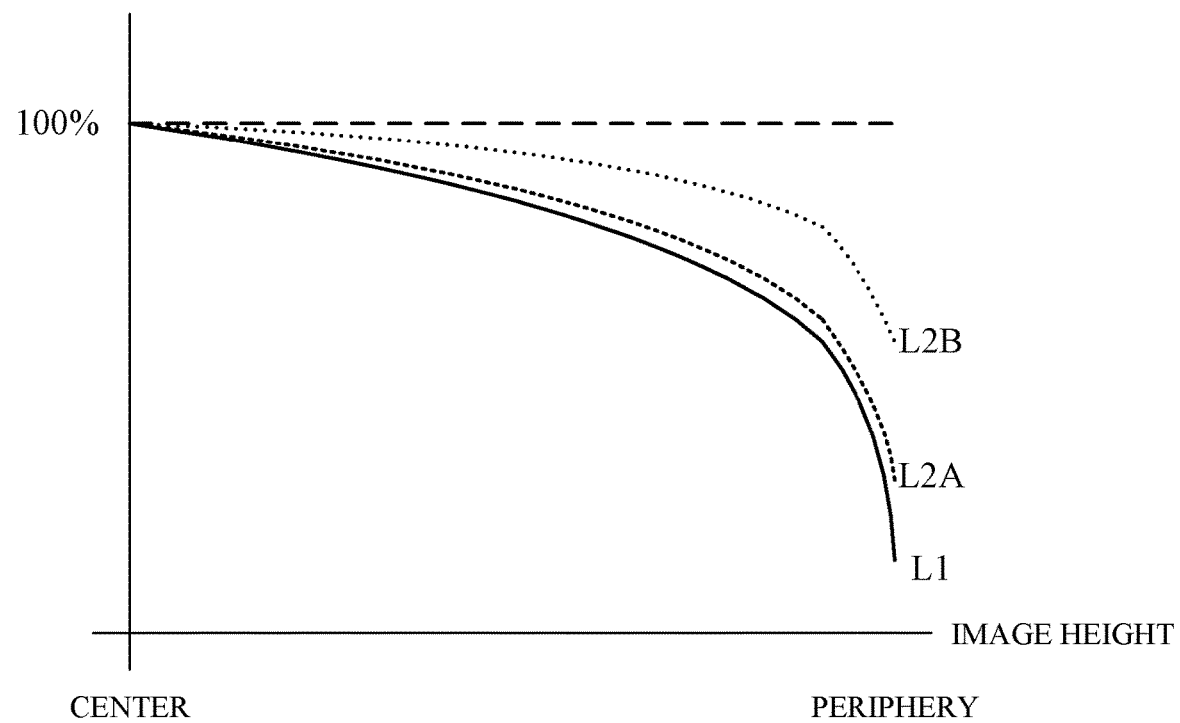
FIG. 3 is a graph illustrating a relationship between an image height and a light quantity in the first embodiment.

Referring now to FIG. 3, a description will be given of the first data group X1 and the second data group Y1. The first data group X1 and the second data group Y1 are data groups indicating a light quantity correction value for each image height at the focus position, zoom position, and aperture position of the lens apparatus 101. The details will be described below. FIG. 3 is a graph illustrating a relationship between an image height and a light quantity in a case where the focus lens 1001 is located at a close (short-distance) end, the zoom lens 1002 is located at a wide-angle end, and the aperture stop 1003 is located at an open end, respectively. In FIG. 3, a horizontal axis represents an image height [mm] of the image sensor 1101, and a vertical axis represents a light quantity ratio when the center of the image height is normalized to 100 [%].

In FIG. 3, L1 denotes a graph illustrating the optical characteristic of the lens apparatus 101, that is, a graph illustrating a relationship between an image height and a light quantity on an imaging plane in a case where uniform light is introduced from the object side of the lens apparatus 101. L2A denotes a graph illustrating a relationship between an image height and a light quantity in a case where a combination of the lens apparatus 101 and the image pickup apparatus 102A is used for real imaging and no correction is made with the correction data. That is, a difference between the graph L1 and the graph L2A is a light quantity changing amount caused by the image pickup apparatus 102A. L2B denotes a graph illustrating a relationship between an image height and a light quantity in a case where a combination of the lens apparatus 101 and the image pickup apparatus 102B is used for real imaging and no correction is made with the correction data. That is, a difference between the graph L1 and the graph L2B is a light quantity changing amount caused by the image pickup apparatus 102B.

The first data group X1 is a set of data indicating a correction amount corresponding to each of the focus position, the zoom position, and the aperture position in the optical characteristic of the lens apparatus 101. That is, the first data group X1 includes the correction amount in the graph L1 of FIG. 3. Generally, the correction amount for the light quantity changing amount may be a reciprocal of the light quantity changing amount.

The second data group Y1 is a data group for performing good correction in the combination of the lens apparatus 101 and the image pickup apparatus 102A, and indicates a correction amount for each of the focus position, the zoom position, and the aperture position. That is, the second data group Y1 includes the correction amount in the graph L2A of FIG. 3. Since the image pickup apparatus 102A makes correction using the correction data as it is output from the lens apparatus 101, the lens apparatus 101 stores the second data group Y1 as the correction data for the image pickup apparatus 102A. The correction data 1 is generated and output by the data generating unit 1008 in the lens apparatus 101 according to the current focus position, zoom position, and aperture position based on the first data group X1 stored in the memory 1007. The correction data 2 is generated and output by the data generating unit 1008 in the lens apparatus 101 according to the current focus position, zoom position, and aperture position based on the second data group Y1 stored in the memory 1007.

The correction amount in the graph L2B in FIG. 3 is not included in any of the first data group X1 and the second data group Y1. The image pickup apparatus 102B generates new correction data based on the characteristic of the image pickup apparatus 102B using the correction data output from the lens apparatus 101. Thus, since the image pickup apparatus 102B receives the first data group X1 from the lens apparatus 101 and uses it for correction, the lens apparatus 101 does not need to store the correction data for the image pickup apparatus 102B.

Figure 4:
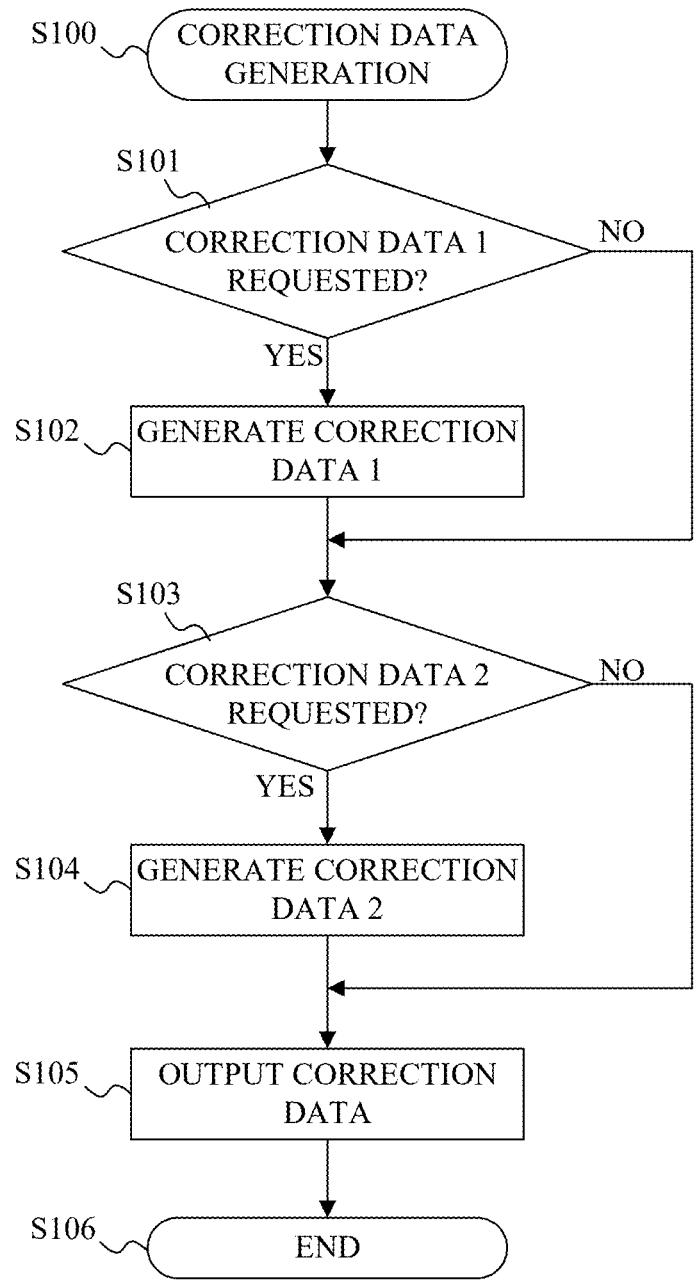
FIG. 4 is a flowchart of correction data generating processing by a lens apparatus according to the first embodiment.

Referring now to FIG. 4, a description will be given of the generation and communication of correction data by the data generating unit 1008 and the communication unit 1009 in the lens apparatus 101. FIG. 4 is a flowchart of correction-data generating processing by the lens apparatus 101. The flowchart of FIG. 4 starts in a case where correction data is requested by communication from the image pickup apparatus 102.

First, in step S100, the lens apparatus 101 starts the correction-data generating processing. Next, in step S101, the data generating unit 1008 in the lens apparatus 101 determines whether or not the correction data 1 is included in the correction data requested by the image pickup apparatus 102. In a case where the correction data 1 is included, the flow proceeds to step S102. On the other hand, in a case where the correction data 1 is not included, the flow proceeds to step S103.

In step S102, the data generating unit 1008 generates correction data 1 based on the positions detected by the F-position detecting unit 1004, the Z-position detecting unit 1005, and the I-position detecting unit 1006 based on the first data group X1 stored in the memory 1007. In step S103, the data generating unit 1008 determines whether or not the correction data 2 is included in the correction data requested by the image pickup apparatus 102. In a case where the correction data 2 is included, the flow proceeds to step S104. On the other hand, in a case where the correction data 2 is not included, the flow proceeds to step S105.

In step S104, the data generating unit 1008 generates the correction data 2 based on the positions detected by the F-position detecting unit 1004, the Z-position detecting unit 1005, and the I-position detecting unit 1006, and the second data group Y1 stored in the memory 1007. In step S105, the communication unit 1009 outputs the correction data generated by the data generating unit 1008 to the image pickup apparatus 102. Next, in step S106, this processing ends. According to the above flow, the lens apparatus 101 outputs the correction data in response to the request of the image pickup apparatus 102.

Figure 5:
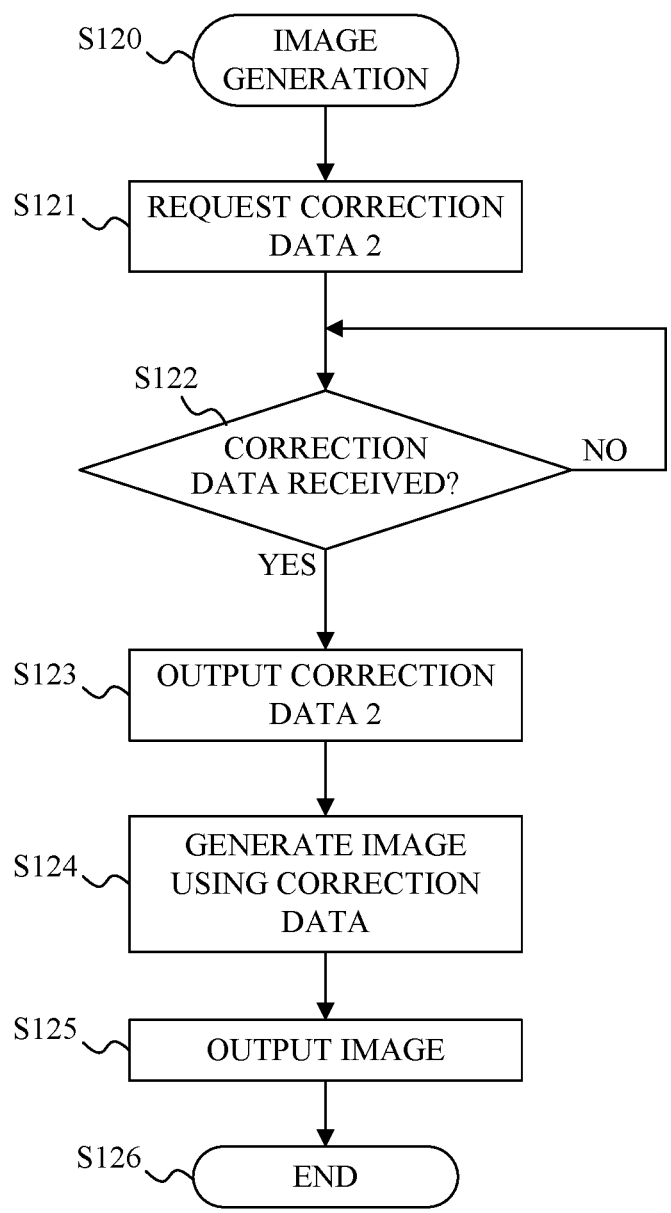
FIG. 5 is a flowchart of image generating processing by an image pickup apparatus according to the first embodiment.
Figure 6:
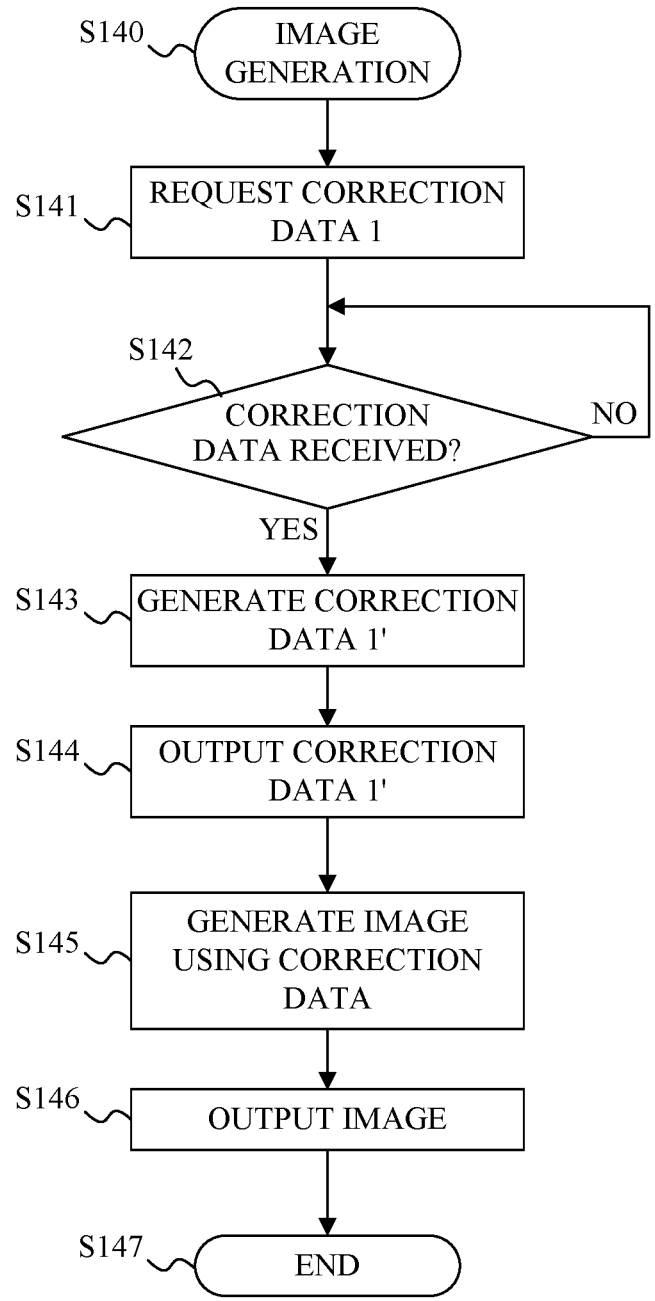
FIG. 6 is a flowchart of image generating processing by the image pickup apparatus according to the first embodiment.

Referring now to FIGS. 5 and 6, a description will be given of image generating processing by each of the image pickup apparatuses 102A and 102B. FIG. 5 is a flowchart of the image generating processing by the image pickup apparatus 102A. FIG. 6 is a flowchart of the image generating processing by the image pickup apparatus 102B. The flowcharts of FIGS. 5 and 6 start whenever an image is captured.

First, in step S120 of FIG. 5, the image pickup apparatus 102A starts the image generating processing. Next, in step S121, the data generating unit 1103A in the image pickup apparatus 102A requests the lens apparatus 101 for the correction data 2. The correction data 2 is generated and output by the data generating unit 1008 based on the second data group Y1 stored in the memory 1007 in the lens apparatus 101.

Next, in step S122, the data generating unit 1103 A determines whether or not the correction data has been received from the lens apparatus 101. In a case where the correction data has been received, the flow proceeds to step S123. On the other hand, in a case where the correction data has not yet been received, step S122 is repeated.

In step S123, the data generating unit 1103A outputs the correction data 2 received from the lens apparatus 101 to the image processing unit 1104. Next, in step S124, the image processing unit 1104 uses the correction data 2 to generate a corrected image of the image (captured image) obtained from the image sensor 1101. Next, in step S125, the image output unit 1105 outputs the image (corrected image) generated by the image processing unit 1104. Next, in step S126, this processing ends.

In step S140 of FIG. 6, the image pickup apparatus 102B starts the image generating processing. Next, in step S141, the data generating unit 1103B in the image pickup apparatus 102B requests the lens apparatus 101 for the correction data 1. The correction data 1 is generated and output by the data generating unit 1008 based on the first data group X1 stored in the memory 1007 in the lens apparatus 101.

Next, in step S142, the data generating unit 1103B determines whether or not the correction data has been received from the lens apparatus 101. In a case where the correction data has been received, the flow proceeds to step S143. On the other hand, in a case where the correction data has not yet been received, step S142 is repeated.

In step S143, the data generating unit 1103A generates the correction data 1' using the correction data 1 received from the lens apparatus 101 and the correction data based on the characteristic of the image pickup apparatus 102B (characteristic relating the peripheral light quantity of the image pickup apparatus 102B) stored in the memory 1106. Next, in step S144, the data generating unit 1103A outputs the generated correction data 1' to the image processing unit 1104. Next, in step S145, the image processing unit 1104 generates a corrected image of the image (captured image) obtained from the image sensor 1101, using the correction data 1'. Next, in step S146, the image output unit 1105 outputs an image (corrected image) generated by the image processing unit 1104. Next, in step S147, this processing ends.

Next follows a description of the effect of this embodiment. First, the effect using the image pickup apparatus 102A will be described. By requesting the lens apparatus 101 for the correction data 2, the image pickup apparatus 102A can acquire the correction data for satisfactory correction in the combination of the lens apparatus 101 and the image pickup apparatus 102A. Thus, the image pickup apparatus 102A can perform good correction using the correction data 2 as it is output from the lens apparatus 101.

Next, the effect using the image pickup apparatus 102B will be described. The image pickup apparatus 102B can acquire the correction data in the optical characteristic of the lens apparatus 101 by requesting the lens apparatus 101 for the correction data 1. Thereafter, by generating new correction data 1' based on the characteristic of the image pickup apparatus 102B using the correction data 1 output from the lens apparatus 101, the correction can be satisfactorily performed.

As described above, in this embodiment, the lens apparatus 101 stores the first data group X1 indicating the correction amount in the optical characteristic of the lens apparatus 101, and the second data group Y1 for satisfactory correction in in the combination of the lens apparatus 101 and the image pickup apparatus 102A. Thereby, both the image pickup apparatus 102A that performs correction using the correction data as it is output from the lens apparatus 101 and the image pickup apparatus 102B that generates new correction data based on the characteristic of the image pickup apparatus using the correction data can make satisfactory corrections. Even the image pickup apparatus 102C having a characteristic different from that of the image pickup apparatus 102B can generate new correction data based on the characteristic of the image pickup apparatus 102C using the correction data 1 in the image pickup apparatus 102C.

Second Embodiment

Figure 7:
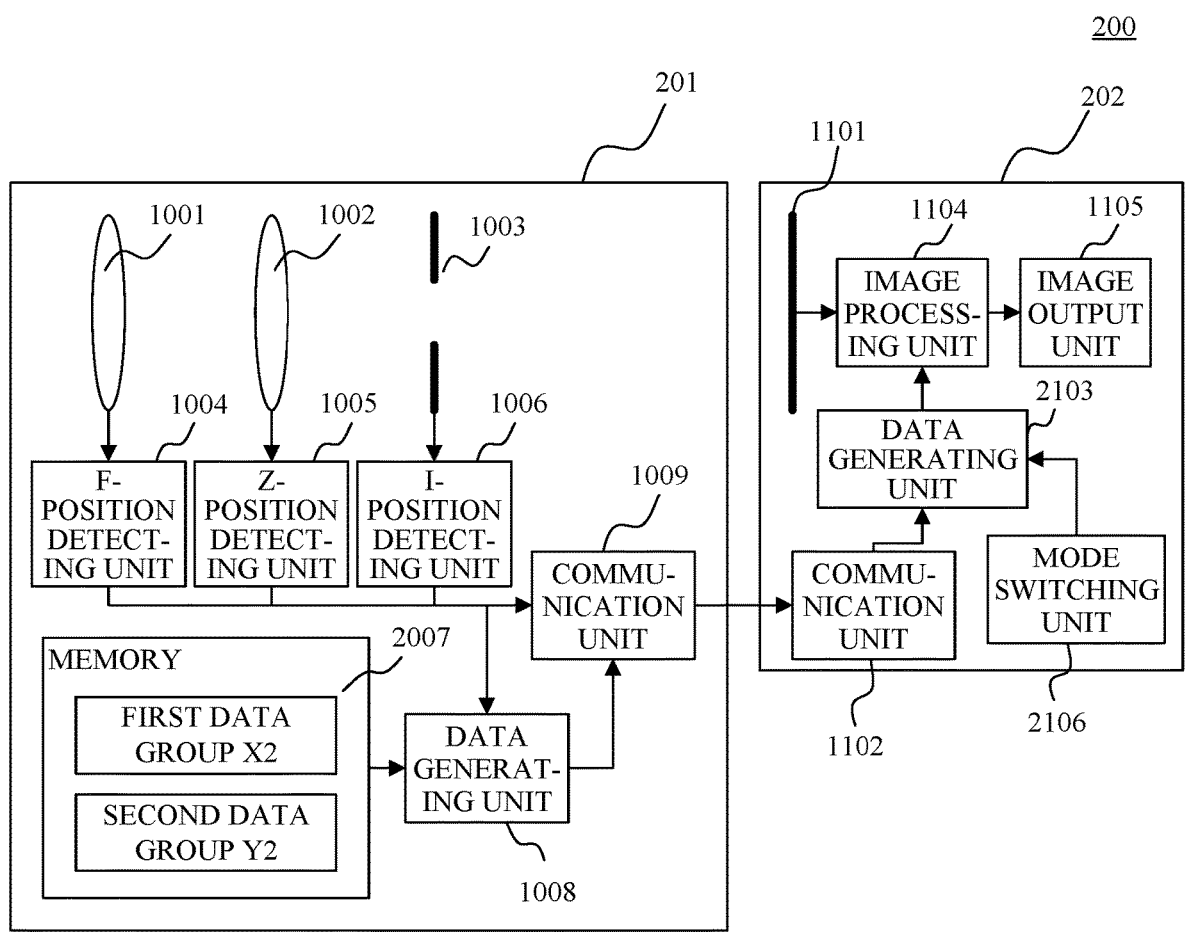
FIG. 7 is a block diagram of an imaging system according to a second embodiment.

Referring now to FIG. 7, a description will be given of an imaging system that includes an accessory according to a second embodiment of the disclosure. In this embodiment, the accessory is a lens apparatus attachable to and detachable from the image pickup apparatus. FIG. 7 is a block diagram of the imaging system 200. The imaging system 200 includes an image pickup apparatus 202 and a lens apparatus 201 attachable to and detachable from the image pickup apparatus 202. This embodiment will omit a description of a configuration common to that of the imaging system of the first embodiment.

A memory 2007 of the lens apparatus 201 is a storage unit for storing data, and stores a first data group X2 and a second data group Y2, which are different from the data groups of the first embodiment. A mode switching unit 2106 of the image pickup apparatus 202 is a switching unit switchable between a normal image capturing mode and a combined image capturing mode as the image capturing mode of the image pickup apparatus 202. A data generating unit 2103 requests proper correction data via the communication unit 1102 according to the image capturing mode by the mode switching unit 2106, and generates data for correcting a peripheral light quantity based on the received correction data. In this embodiment, the correction data received by the communication unit 1102 is output as it is to the data generating unit 2103.

Figure 8:
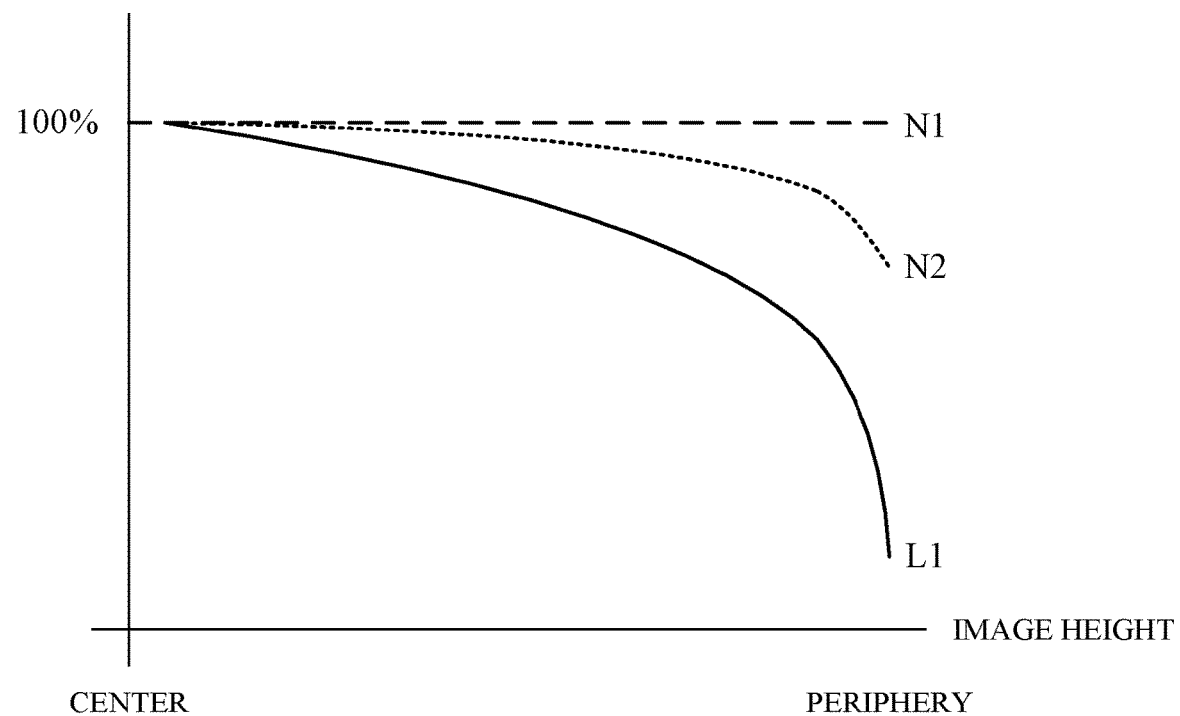
FIG. 8 is a graph illustrating a relationship between an image height and a light quantity in the second embodiment.

Referring now to FIG. 8, a description will be given of the first data group X2 and the second data group Y2 in this embodiment. Similar to FIG. 3, FIG. 8 is a graph illustrating a relationship between an image height and a light quantity in a case where the focus lens 1001 is located at a close end, the zoom lens 1002 is located at a wide-angle end, and the aperture stop 1003 are located at an open end, respectively. In FIG. 8, a horizontal axis represents an image height [mm] of the image sensor 1101, and a vertical axis represents a light quantity ratio when the center of the image height is normalized to 100 [%].

L1 denotes a graph illustrating the optical characteristic of the lens apparatus 201 similar to the first embodiment, that is, a graph illustrating a relationship between an image height and a light quantity on an imaging plane in a case where uniform light is introduced from the object side of the lens apparatus 201. The first data group X2 is also a data group indicating a correction amount in the optical characteristic of the lens apparatus 201, that is, includes a correction amount in the graph L1, similar to the first embodiment. In this embodiment, for the sake of simplification of the description, assume that there is no light quantity changing amount caused by the image pickup apparatus 202. That is, a graph illustrating a relationship between the image height and the light quantity in a case where a combination of the lens apparatus 201 and the image pickup apparatus 202 is used for real imaging and no correction is made with the correction data is the same as L1.

N1 denotes a graph illustrating a relationship between an image height and a light quantity after an image is corrected with the first data group X2 in the image pickup apparatus 202, and the light quantity is uniform over the entire image. Here, it is conceivable that a part of the image is actually excessively corrected due to a shift between the optical axis of the lens apparatus 201 and the center of the image pickup apparatus of the image pickup apparatus 202 or other influences. That is, the first data group X2 is correction data for a case where it is desirable that the light quantity is uniform over the entire screen even in anticipation that a part of the image will be excessively corrected.

On the other hand, N2 denotes a graph illustrating a relationship between an image height and a light quantity after an image is corrected with the second data group Y2 in the image pickup apparatus 202. In comparison with L1 as the graph with no correction, the correction result leaves smooth shading in the image by leaving the optical characteristic of the lens apparatus 201 while improving the drop of the peripheral light quantity drop in the entire image. A correction value of the second data group Y2 may be acquired by multiplying a correction value of the first data group X2 by a ratio corresponding to N2.

In this embodiment, a flow of correction data generation and communication by the data generating unit 1008 in the lens apparatus 201 is the same as that of the first embodiment described with reference to FIG. 4, so a description thereof will be omitted.

Figure 9:
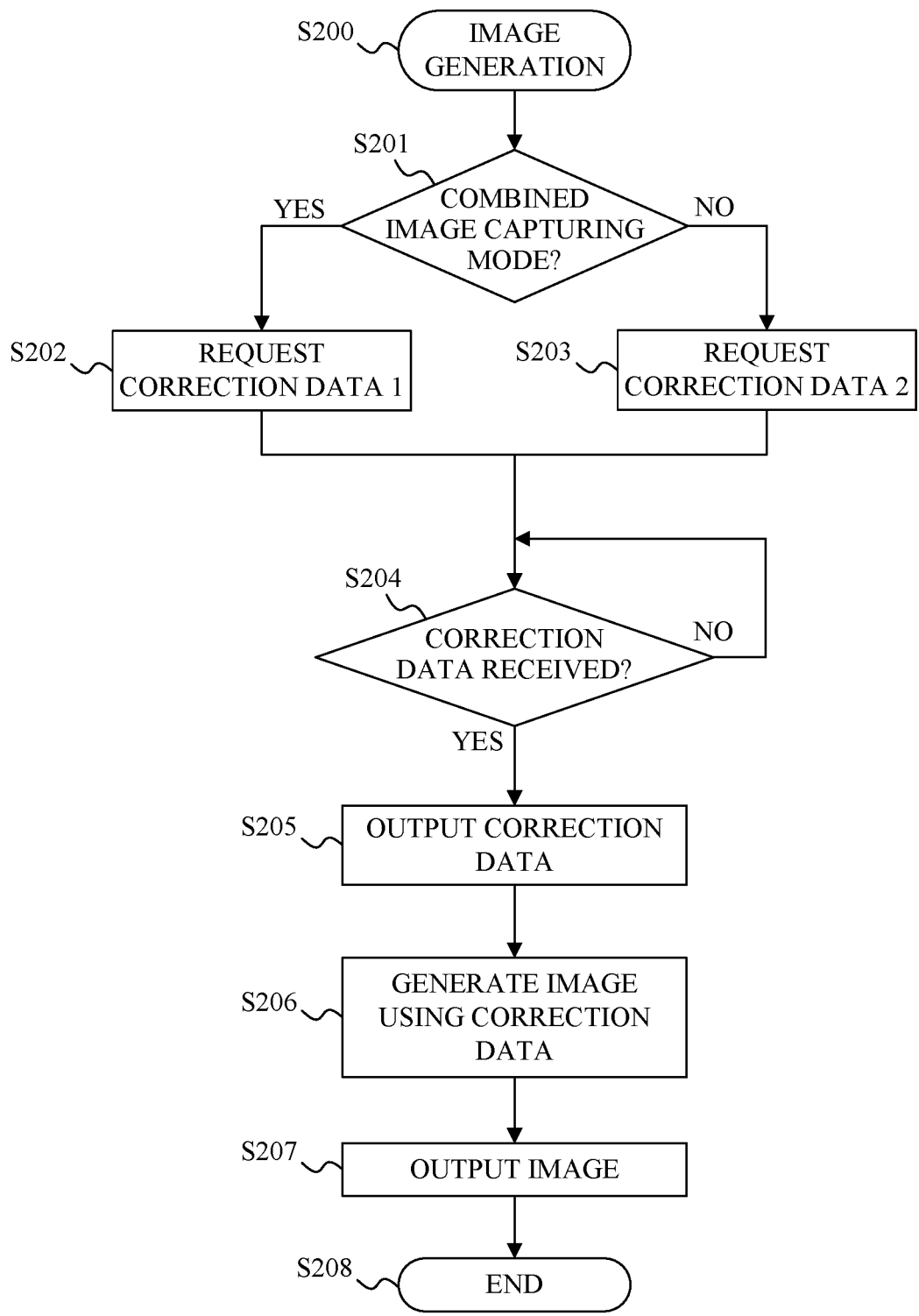
FIG. 9 is a flowchart of image generating processing by an image pickup apparatus according to the second embodiment.

Referring now to FIG. 9, a description will be given of image generating processing by the image pickup apparatus 202. FIG. 9 is a flowchart of image generating processing by the image pickup apparatus 202. The flowchart of FIG. 9 starts whenever an image is captured.

First, in step S200, the image pickup apparatus 202 starts the image generating processing. Next, in step S201, the data generating unit 2103 determines whether or not the image capturing mode set by the mode switching unit 2106 is the combined image capturing mode. In a case where the image capturing mode is the combined image capturing mode, the flow proceeds to step S202. On the other hand, in a case where the image capturing mode is not the combined image capturing mode, the flow proceeds to step S203.

In step S202, the data generating unit 2103 in the image pickup apparatus 202 requests the lens apparatus 201 for the correction data 1, and the flow proceeds to step S204. In step S203, the data generating unit 2103 requests the lens apparatus 201 for the correction data 2, and the flow proceeds to step S204.

In step S204, the data generating unit 2103 determines whether or not the correction data has been received from the lens apparatus 201. In a case where the correction data has been received, the flow proceeds to step S205. On the other hand, in a case where the correction data has not yet been received, step S204 is repeated.

In step S205, the data generating unit 2103 outputs the correction data received from the lens apparatus 201 to the image processing unit 1104. Next, in step S206, the image processing unit 1104 generates a corrected image of the image (captured image) obtained from the image sensor 1101 using the correction data. Next, in step S207, the image output unit 1105 outputs an image (corrected image) generated by the image processing unit 1104. Next, in step S208, this processing ends.

Next follows a description of the effect of this embodiment. In the normal image capturing mode, the image pickup apparatus 202 requests the lens apparatus 201 for the correction data 2 and makes corrections, thereby producing an effect of leaving smooth shading in the image, as illustrated by N2 in FIG. 8. On the other hand, in the combined image capturing mode, the lens apparatus 201 is requested for the correction data 1, the correction is made, and an image having a wholly uniform light quantity can be obtained as illustrated by N1 in FIG. 8. Thereby, in the image combination, the light quantity that is uniform over the entire image can provide smooth combination processing.

As described above, the lens apparatus 201 according to this embodiment includes the first data group X2 indicating a correction amount in the optical characteristic of the lens apparatus 201 and the second data group Y2 for correction that leaves smooth shading in an image. Thereby, the image pickup apparatus 202 can acquire proper correction data according to the image capturing mode and provide a properly corrected image.

In this embodiment, the image pickup apparatus 202 is configured to switch the correction data to be acquired according to the image capturing mode, but the disclosure is not limited to this example. For example, the image pickup apparatus 202 can acquire both the correction data 1 and the correction data 2 and embed them as metadata in the captured image, so that any correction can be applied to the captured image by post-processing. By embedding both correction values, after correction is made with the correction data 1, image combination is performed, the correction is returned using the correction data 1, and then the correction is again made using the correction data 2. That is, it is possible to acquire a correction result that leaves smooth shading in the image after the image combination. This is particularly effective in combining a computer graphics (CG) object with a real image as a background.

Third Embodiment

Figure 10:
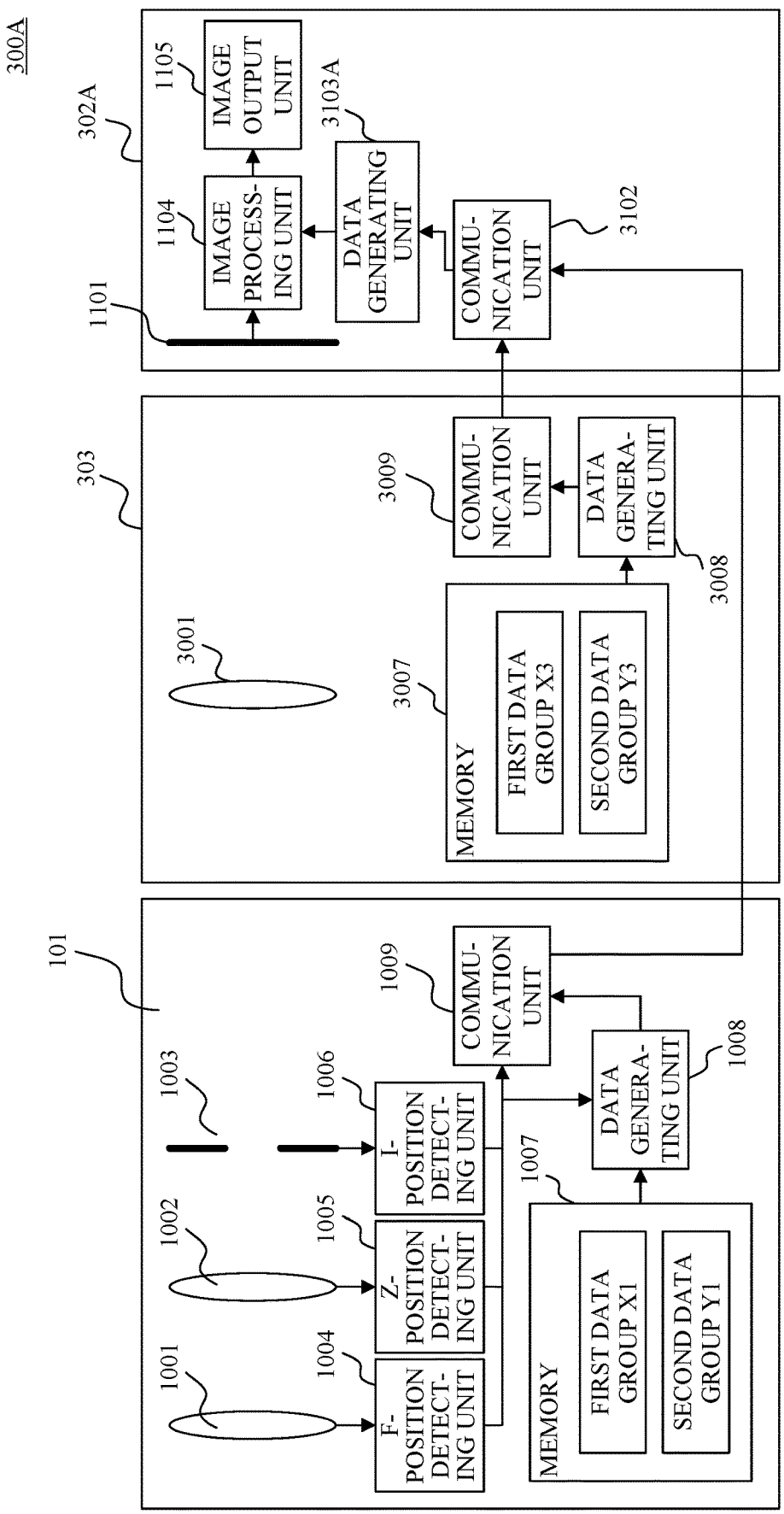
FIG. 10 is a block diagram of an imaging system according to a third embodiment.
Figure 11:
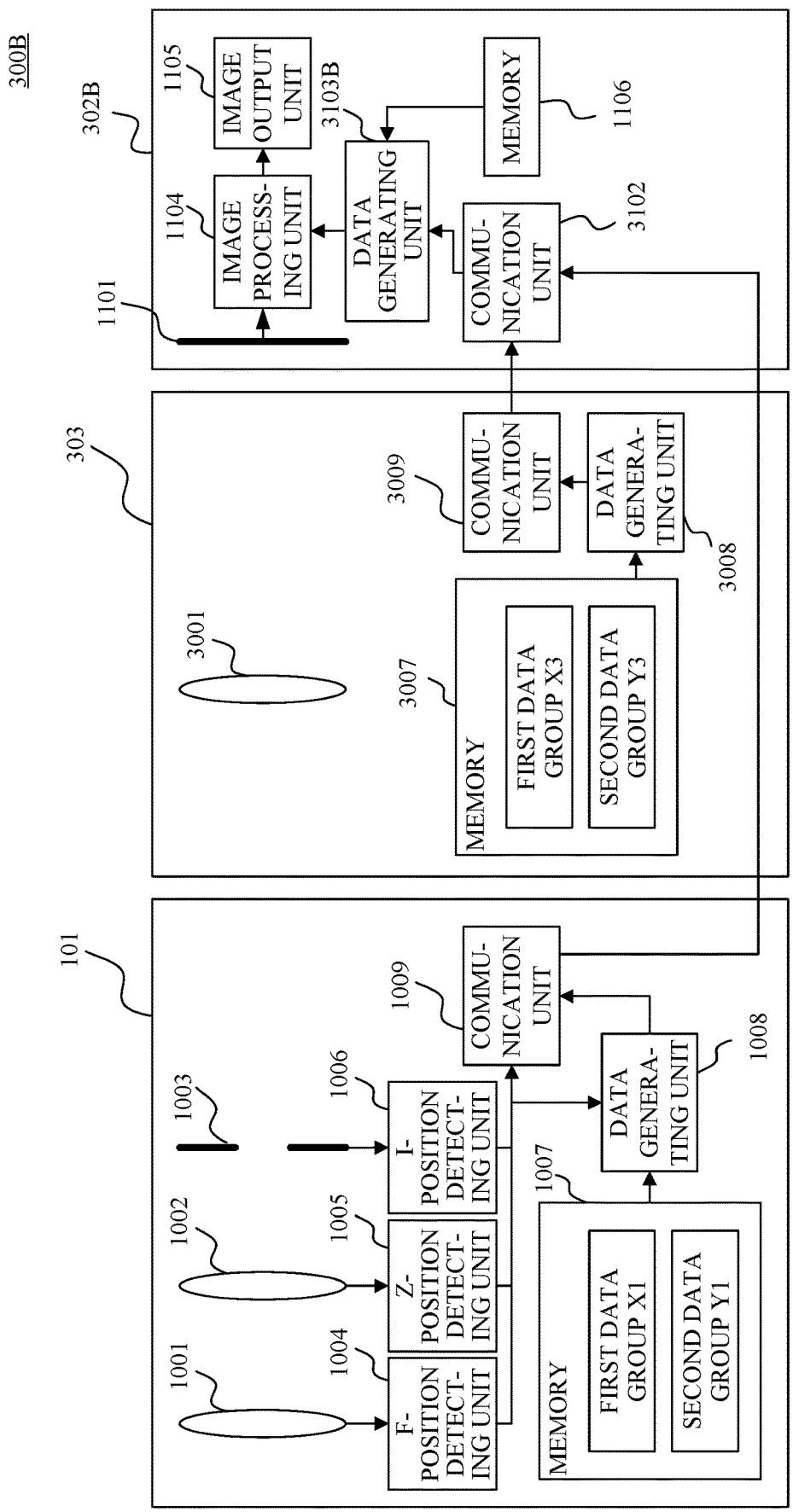
FIG. 11 is a block diagram of the imaging system according to the third embodiment.

Referring now to FIGS. 10 and 11, a description will be given of an imaging system that includes an accessory according to a third embodiment of the disclosure. In this embodiment, the accessory is at least one of a lens apparatus and an adapter apparatus attachable and detachable between the image pickup apparatus and the lens apparatus. In this embodiment, first data is data relating to the optical characteristic of the accessory and the optical characteristic of the lens apparatus, or data relating to the optical characteristic of the accessory and the optical characteristic of the adapter.

FIG. 10 is a block diagram of an imaging system 300A. FIG. 11 is a block diagram of an imaging system 300B. The image pickup apparatuses 302A and 302B are directly detachably attached (connectable) to the lens apparatus 101 and detachably attached (connectable) to the lens apparatus 101 via the adapter apparatus 303. This embodiment is also applicable to an adapter apparatus attachable to and detachable from the object side of the lens apparatus 101 (that is, an imaging system in which the adapter apparatus, the lens apparatus, and the image pickup apparatus are attachable in this order).

The imaging system 300A illustrated in FIG. 10 includes the image pickup apparatus 302A, the lens apparatus 101, and the adapter apparatus 303 attachable and detachable between the image pickup apparatus 302A and the lens apparatus 101. The image pickup apparatus 302A performs optical correction using the correction data as it is output from the communication unit 1009 in the lens apparatus 101. Since the lens apparatus 101 is equivalent to the lens apparatus described in the first embodiment, a description thereof will be omitted.

The adapter apparatus 303 is an intermediate adapter that changes magnification of an image from the lens apparatus 101 and images it on the image sensor 1101 in the image pickup apparatus 302A via a magnification-varying lens 3001, and is, for example, an extender or a reduction optical system. A detailed description will now be given of the internal configuration of the adapter apparatus 303.

A memory 3007 is a storage unit for storing data, and stores a first data group X3 and a second data group Y3. The memory 3007 may be, for example, either a ROM (internal memory) inside a CPU or an external memory different from the CPU. A data generating unit 3008 generates correction data to be notified to the image pickup apparatus 302A based on the identification (ID) information of the connected lens apparatus 101, which has been received from the image pickup apparatus 302A, and the data stored in the memory 3007. The details of the data generating unit 3008 will be described below. A communication unit 3009 transmits and receives information to and from the image pickup apparatus 302A. In this embodiment, the identification information of the connected lens apparatus 101 is received from the image pickup apparatus 302A, and the correction data generated by the data generating unit 3008 is communicated.

Similar to the image pickup apparatus 102A of the first embodiment, the image pickup apparatus 302A performs peripheral light quantity correction (optical correction) for an image captured by the image sensor 1101 using the received correction data. A communication unit 3102 transmits and receives correction data and the like to and from the communication unit 1009 in the lens apparatus 101 and the communication unit 3009 in the adapter apparatus 303, respectively.

A data generating unit 3103A requests the correction data 2 via the communication unit 3102, and generates data for the peripheral light quantity correction based on the correction data 2. In a case where the lens apparatus 101 and the image pickup apparatus 302A are directly connected without the adapter apparatus 303, the data generating unit 3103A requests the lens apparatus 101 for the correction data 2. On the other hand, in a case where the lens apparatus 101 and the image pickup apparatus 302A are connected via the adapter apparatus 303, the data generating unit 3103A requests the adapter apparatus 303 for the correction data 2. The data generating unit 3103A acquires various position information from the lens apparatus 101 based on the correction data 2 received from the communication unit 3102, generates correction data 2' corresponding to the various position information, and makes correction with it. The details will be described below.

The imaging system 300B illustrated in FIG. 11 includes the image pickup apparatus 302B, the lens apparatus 101, and the adapter apparatus 303 attachable and detachable between the image pickup apparatus 302B and the lens apparatus 101. The image pickup apparatus 302B generates new correction data based on the characteristic of the image pickup apparatus 302B using the correction data output from the communication unit 1009 in the lens apparatus 101, and performs optical correction. Since the lens apparatus 101 and the adapter apparatus 303 are equivalent to the lens apparatus and the adapter apparatus of FIG. 10, a description thereof will be omitted.

Similar to the image pickup apparatus 102B of the first embodiment, the image pickup apparatus 302B generates new correction data based on the characteristic of the image pickup apparatus 302B using the received correction data for an image captured by the image sensor 1101 and corrects a peripheral light quantity. Since the communication unit 3102 is the same as the image pickup apparatus 302A, a description thereof will be omitted. The image processing unit 1104, the image output unit 1105, and the memory 1106 are the same as those in the image pickup apparatus 102B of the first embodiment, and a description thereof will be omitted.

A data generating unit 3103B requests the correction data 1 via the communication unit 3102, generates new correction data based on the characteristic of the image pickup apparatus 302B using the correction data 1, and generates data for correcting a peripheral light quantity. In a case where the lens apparatus 101 and the image pickup apparatus 302B are directly connected without the adapter apparatus 303, the data generating unit 3103B requests the lens apparatus 101 for the correction data 1. On the other hand, in a case where the lens apparatus 101 and the image pickup apparatus 302B are connected via the adapter apparatus 303, the data generating unit 3103B requests the adapter apparatus 303 for the correction data 1. The data generating unit 3103B acquires various position information from the lens apparatus 101. The data generating unit 3103B generates correction data 1' based on the characteristic of the image pickup apparatus 302B and the various position information using the correction data 1 received by the communication unit 3102 and the characteristic of the image pickup apparatus 302B stored in the memory 1106, and makes correction. The details will be described below.

Figure 12:
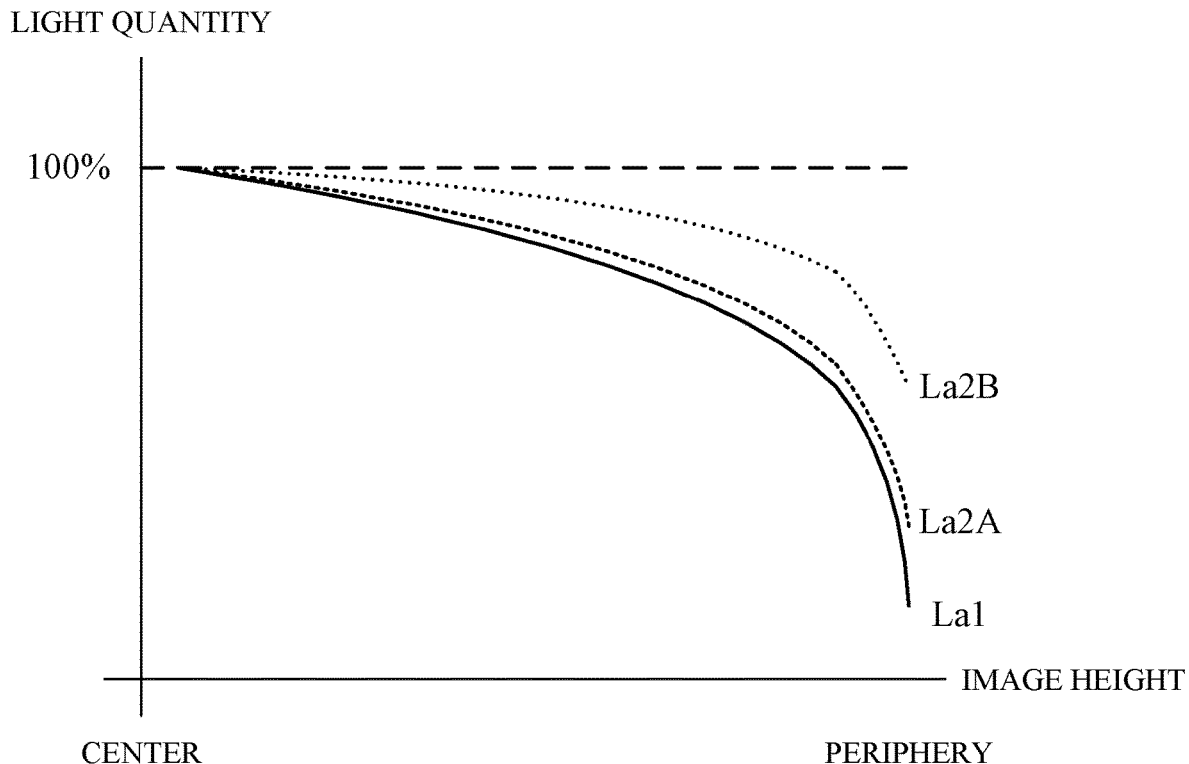
FIG. 12 is a graph illustrating a relationship between an image height and a light quantity in the third embodiment.

Referring now to FIG. 12, a description will be given of the first data group X3 and the second data group Y3 stored in the memory 3007 of the adapter apparatus 303. FIG. 12 is a graph illustrating a relationship between an image height and a light quantity in a case where the focus lens 1001 is located at a close end, the zoom lens 1002 is located at a wide-angle end, and the aperture stop 1003 is located at an open end, respectively. In FIG. 12, a horizontal axis represents the image height [mm] of the image sensor 1101, and a vertical axis represents the light quantity ratio when the center of the image height is normalized to 100 [%].

La1 denotes a graph illustrating an optical characteristic of an optical system in which the lens apparatus 101 and the adapter apparatus 303 are combined, that is, a graph illustrating a relationship between an image height and a light quantity in an imaging plane through the adapter apparatus 303 in a case where uniform light is introduced from the object side of the lens apparatus 101. La2A denotes a graph illustrating a relationship between an image height and a light quantity in a case where a combination of the lens apparatus 101, the adapter apparatus 303, and the image pickup apparatus 302A are used for real imaging and no correction is made with the correction data. That is, a difference between the graph La1 and the graph La2A is a light quantity changing amount caused by the image pickup apparatus 302A. La2B denotes a graph illustrating a relationship between an image height and a light quantity in a case where a combination of the lens apparatus 101, the adapter apparatus 303, and the image pickup apparatus 302B is used for real imaging and no correction is made with the correction data. That is, a difference between the graph La1 and the graph La2B is a light quantity changing amount caused by the image pickup apparatus 302B.

The first data group X3 is a set of data indicating a correction amount for each of the focus position, the zoom position, and the aperture position in the optical characteristic of the optical system in which the lens apparatus 101 and the adapter apparatus 303 are combined. That is, the first data group X3 includes the correction amount in the graph La1 of FIG. 12. In general, the correction amount for the light quantity changing amount may be set to a reciprocal of the light quantity changing amount.

The second data group Y3 is a data group for performing good correction in the combination of the lens apparatus 101, the adapter apparatus 303, and the image pickup apparatus 302A, and is a set of data indicating a correction amount for each of the focus position, the zoom position, and the aperture position. That is, the second data group Y3 includes the correction amount in the graph La2A of FIG. 12. This is because the image pickup apparatus 302A makes correction using the correction data as it is output from the adapter apparatus 303, so that the adapter apparatus 303 stores the second data group Y3 as the correction data for the image pickup apparatus 302A.

The correction amount in the graph La2B of FIG. 12 is not included in either the first data group X3 or the second data group Y3. The image pickup apparatus 302B generates new correction data based on the characteristic of the image pickup apparatus 302B using the correction data output from the adapter apparatus 303. Therefore, the adapter apparatus 303 does not store the correction data for the image pickup apparatus 302B, but stores the first data group X3, which is a correction amount in the optical characteristic of the optical system in which the lens apparatus 101 and the adapter apparatus 303 are combined.

Figure 13:
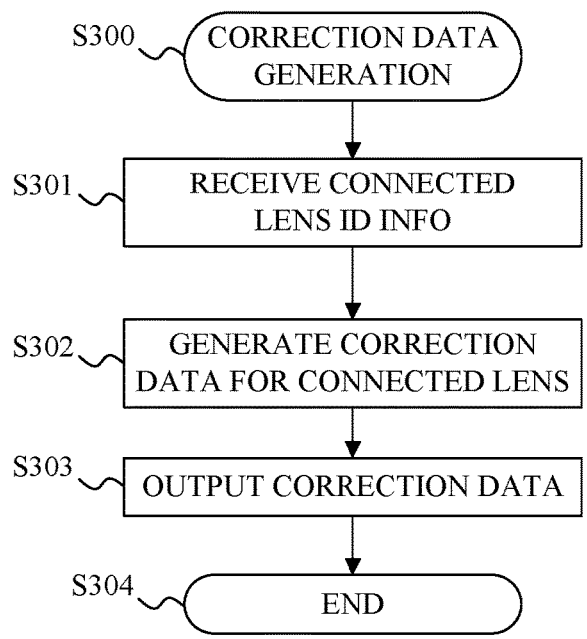
FIG. 13 is a flowchart of correction data generating processing by an adapter apparatus according to the third embodiment.

Referring now to FIG. 13, a description will be given of the generation and communication of the correction data by the data generating unit 3008 and the communication unit 3009 in the adapter apparatus 303. FIG. 13 is a flowchart of correction data generating processing by the adapter apparatus 303. The flowchart of FIG. 13 starts in a case where correction data is requested by communication from the image pickup apparatuses 302A and 302B.

First, in step S300, the adapter apparatus 303 starts the correction data generating processing. Next, in step S301, the adapter apparatus 303 receives identification information (lens identification information) of the lens apparatus 101 connected to the adapter apparatus 303 from the image pickup apparatuses 302A and 302B. Next, in step S302, the data generating unit 3008 generates correction data according to the lens apparatus 101 connected to the adapter apparatus 303. The correction data generated here is a combination of the first data group X3 and the second data group Y3 according to the lens apparatus 101. Next, in step S303, the communication unit 3009 outputs the correction data generated by the data generating unit 3008 to the image pickup apparatuses 302A and 302B. Next, in step S304, this processing ends. According to the above flow, the adapter apparatus 303 outputs the correction data according to the lens identification information about the lens apparatus 101 connected to the adapter apparatus 303, which has been received from the image pickup apparatuses 302A and 302B.

Figure 14:
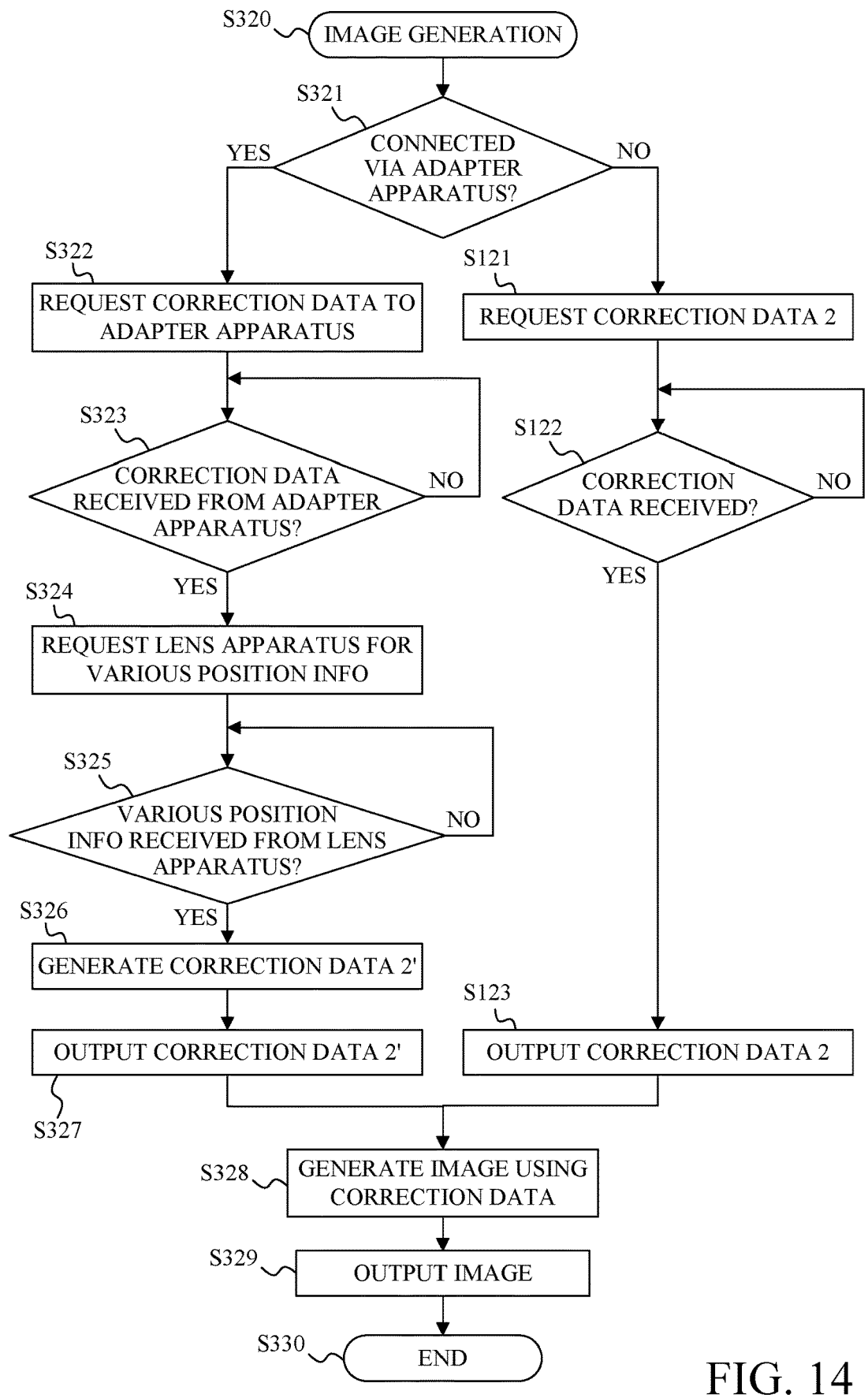
FIG. 14 is a flowchart of image generating processing by an image pickup apparatus according to the third embodiment.
Figure 15:
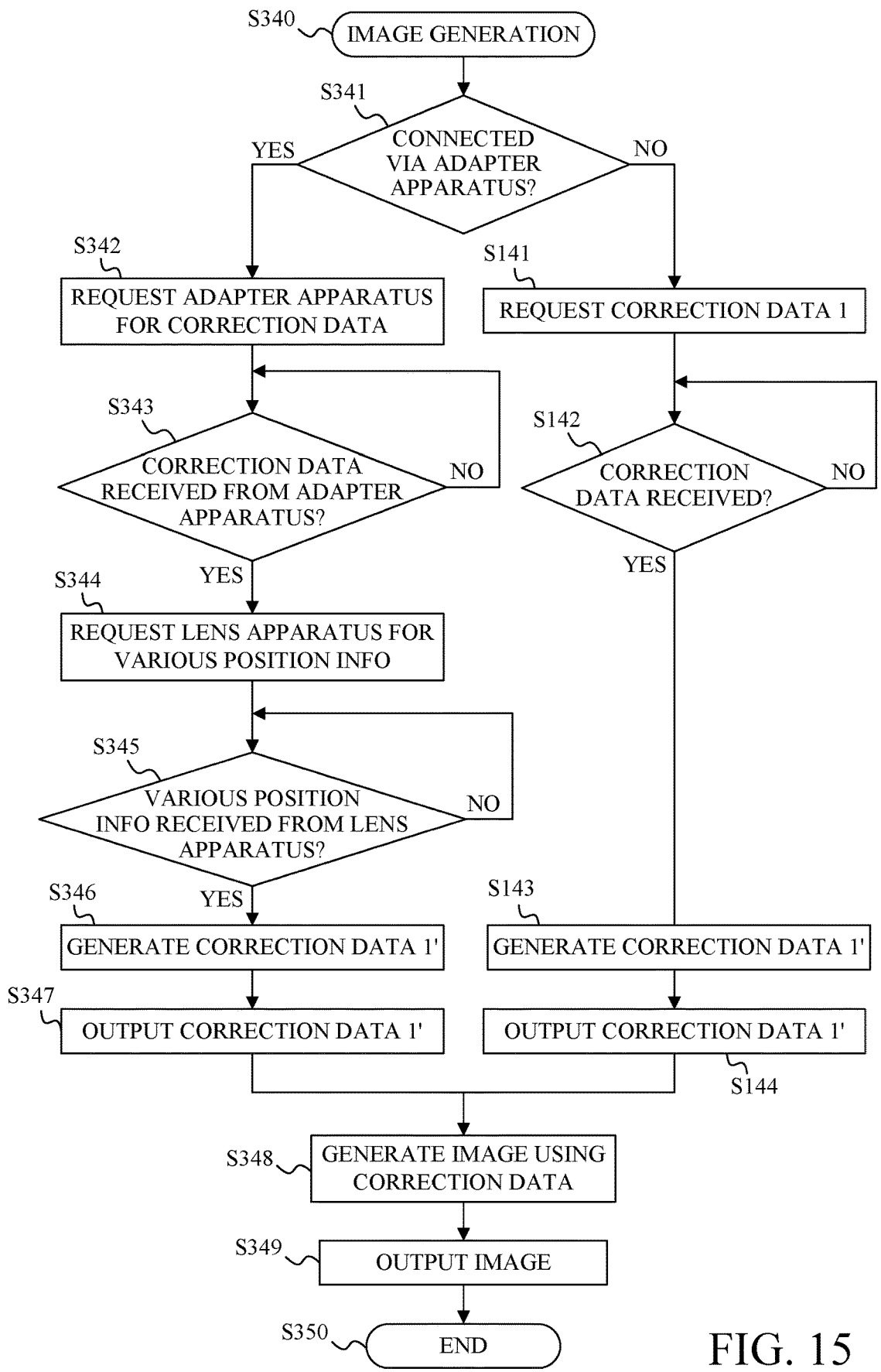
FIG. 15 is a flowchart of the image generating processing by the image pickup apparatus according to the third embodiment.

Referring now to FIGS. 14 and 15, a description will be given of image generating processing by the image pickup apparatuses 302A and 302B. FIG. 14 is a flowchart of image generating processing by the image pickup apparatus 302A. FIG. 15 is a flowchart of image generating processing by the image pickup apparatus 302B. The flowcharts of FIGS. 14 and 15 start whenever an image is captured. Those steps in FIGS. 14 and 15, which are corresponding elements in the first embodiment described with reference to FIGS. 5 and 6, will be designated by the same reference numerals, and a description thereof will be omitted.

First, in step S320 of FIG. 14, the image pickup apparatus 302A starts the image generating processing. Next, in step S321, the image pickup apparatus 302A determines whether or not it is connected to the lens apparatus 101 via the adapter apparatus 303. In a case where the image pickup apparatus 302A is connected to the lens apparatus 101 via the adapter apparatus 303, the flow proceeds to step S322. On the other hand, in a case where the image pickup apparatus 302A is directly connected to the lens apparatus 101, the flow proceeds to step S121.

In step S322, the data generating unit 3103A in the image pickup apparatus 302A requests the adapter apparatus 303 for correction data. Next, in step S323, the data generating unit 3103A determines whether or not the correction data has been received from the adapter apparatus 303. In a case where the correction data has been received, the flow proceeds to step S324. On the other hand, in a case where the correction data has not yet been received, step S323 is repeated. The correction data received from the adapter apparatus 303 is a combination of the first data group X3 and the second data group Y3 according to the lens apparatus 101, as illustrated in step S302.

Next, in step S324, the data generating unit 3103A requests the lens apparatus 101 for various position information. Next, in step S325, the data generating unit 3103A determines whether or not various position information has been received from the lens apparatus 101. In a case where the various position information has been received, the flow proceeds to step S326. On the other hand, in a case where the various position information has not yet been received, step S325 is repeated.

Next, in step S326, the data generating unit 3103A generates correction data 2' based on the second data group Y3 of the received correction data and the various position information. Next, in step S327, the data generating unit 3103A outputs the correction data 2' to the image processing unit 1104. Next, in step S328, the image processing unit 1104 generates a corrected image of the image (captured image) acquired from the image sensor 1101 using the correction data. Next, in step S329, the image output unit 1105 outputs an image (corrected image) generated by the image processing unit 1104. Next, in step S330, this processing ends.

In step S340 of FIG. 15, the image pickup apparatus 302B starts the image generating processing. Next, in step S341, the image pickup apparatus 302B determines whether or not it is connected to the lens apparatus 101 via the adapter apparatus 303. In a case where the image pickup apparatus 302A is connected to the lens apparatus 101 via the adapter apparatus 303, the flow proceeds to step S342. On the other hand, in a case where the image pickup apparatus 302A is directly connected to the lens apparatus 101, the flow proceeds to step S141.

In step S342, the data generating unit 3103B in the image pickup apparatus 302B requests the adapter apparatus 303 for correction data. Next, in step S343, the data generating unit 3103B determines whether or not the correction data has been received from the adapter apparatus 303. In a case where the correction data has been received, the flow proceeds to step S344. On the other hand, in a case where the correction data has not yet been received, step S343 is repeated. The correction data received from the adapter apparatus 303 is a combination of the first data group X3 and the second data group Y3 according to the lens apparatus 101, as illustrated in step S302.

Next, in step S344, the data generating unit 3103B requests the lens apparatus 101 for various position information. Next, in step S345, the data generating unit 3103B determines whether or not the various position information has been received from the lens apparatus 101. In a case where the various position information has been received, the flow proceeds to step S346. On the other hand, in a case where the various position information has not yet been received, step S345 is repeated.

Next, in step S346, the data generating unit 3103B generates correction data 1' based on the first data group X3 of the received correction data, the various position information, and the characteristic (characteristic relating to the peripheral light quantity) of the image pickup apparatus 302B stored in the memory 1106. Next, in step S347, the data generating unit 3103B outputs the correction data 1' to the image processing unit 1104. Next, in step S348, the image processing unit 1104 generates a corrected image of the image (captured image) obtained from the image sensor 1101 using the correction data. Next, in step S349, the image output unit 1105 outputs an image (corrected image) generated by the image processing unit 1104. Next, in step S350, this processing ends.

Next follows a description of the effect of this embodiment. First, the effect using the image pickup apparatus 302A will be described. The image pickup apparatus 302A receives from the adapter apparatus 303 a combination of the first data group X3 and the second data group Y3 as correction data relating to the lens apparatus 101. In the correction, the various position information is acquired from the lens apparatus 101, and the correction is made with reference to the correction data 2 included in the second data group Y3. Thereby, the correction data for satisfactory correction can be acquired in the combination of the lens apparatus 101, the adapter apparatus 303, and the image pickup apparatus 302A. Therefore, the image pickup apparatus 302A can satisfactorily make correction using the correction data 2 as it is referred to from the correction value output from the adapter apparatus 303.

Next, the effect using the image pickup apparatus 302B will be described. The image pickup apparatus 302B also receives the combination of the first data group X3 and the second data group Y3 as correction data relating to the lens apparatus 101 from the adapter apparatus 303. In the correction, the various position information is acquired from the lens apparatus 101, and the new correction data 1' based on the characteristic of the image pickup apparatus 302B is generated by using the correction data 1 included in the first data group X3 for satisfactory correction.

As described above, the adapter apparatus 303 of this embodiment includes the first data group X3 illustrating the correction amount not including the light quantity changing amount caused by the image pickup apparatus 302A, and the second data group Y3 illustrating the correction amount also including the light quantity changing amount caused by the image pickup apparatus 302A. Thereby, both the image pickup apparatus 302A that makes correction using the correction data as it is output from the adapter apparatus 303 and the image pickup apparatus 302B that generates new correction data based on the characteristic of the image pickup apparatus using the correction data can make satisfactory correction. The image pickup apparatus 302C having a characteristic different from that of the image pickup apparatus 302B can also generate new correction data based on the characteristic of the image pickup apparatus 302C using the correction data 1.

In the first and second embodiments, the data generating unit 1008 in the lens apparatus 101 generates the correction data based on the various position information, but the disclosure is not limited to this example. That is, another embodiment may communicate the data group itself as the correction data and periodically communicate the various position information with the image pickup apparatus so as to provide the image pickup apparatus with a function corresponding to the data generating unit. The type of correction data may not be required from the image pickup apparatus. That is, the image pickup apparatus can acquire both the correction data 1 and the correction data 2 and select one of them according to the situation and the application. The image pickup apparatus may receive both the first data group and the second data group as the correction data, and make correction in the image pickup apparatus according to the situation, the application, and various position information.

In the third embodiment, the imaging apparatus receives both the first data group and the second data group as the correction data, and makes correction according to the situation, application, and various position information, but the disclosure is not limited to this example. That is, as described in the third embodiment, the image pickup apparatus may request the adapter apparatus for a type of correction data. The adapter apparatus may acquire various position information, generate correction data, and notify the image pickup apparatus of it. Both the first data group and the second data group of the adapter apparatus may be transmitted to the lens apparatus, and the lens apparatus may generate correction data based on various position information.

In the third embodiment, the adapter apparatus stores as the first data group data on the light quantity changing amount caused by the lens apparatus, but the disclosure is not limited to this example. That is, the lens apparatus may store data on the light quantity changing amount caused by the adapter apparatus. In that case, the lens apparatus switches correction data according to the connected adapter apparatus and transmits the correction data to the image pickup apparatus. Thereafter, the image pickup apparatus may generate correction data to be applied to the image based on the characteristic of the image pickup apparatus using the correction data received from the lens apparatus based on the influence on the adapter apparatus.

The lens apparatus stores data relating to the light quantity changing amount caused by the lens apparatus, and the adapter apparatus stores data relating to the light quantity changing amount caused by the adapter apparatus. The image pickup apparatus acquires a value according to the light quantity changing amount caused by the lens apparatus as correction data from the lens apparatus and a value corresponding to the light quantity changing amount caused by the adapter apparatus as correction data from the adapter apparatus. Thereafter, the image pickup apparatus can also generate correction data to be applied to an image based on the respective correction data and the characteristic of the image pickup apparatus.

The first and third embodiments have described data based on the influence caused by the characteristic of the image pickup apparatus as an example of the second data group for correcting an image captured by the image pickup apparatus. The second embodiment has discussed an example of data for acquiring the effect of leaving smooth shading in an image. However, the disclosure is not limited to these examples, and for example, the second data group may be set to data in which a correction ratio is simply uniformly reduced from the first data group illustrating an optical characteristic (or a data group in which a correction amount is smaller than that of the first data group). This configuration can provide correction while suppressing excessive correction.

For example, the second data group may be set to a data group having fewer sharp correction-value changes in the image height direction than the first data group illustrating the optical characteristic. That is, a correction-amount change of image data by the second data group to an image-height change may be smaller than a correction-amount change of the image data by the first data group to the image-height change.

Especially in the optical characteristic, in a case where there is an inflection point in the characteristic in the image height direction, even the first data group for uniformizing a light quantity over the entire region needs an inflection point to make correction. However, in a case where the center of the optical axis of the optical system and the center of the image sensor shift from each other, or in a case where the center of the optical axis is moved by the image-stabilizing function, the inflection point in the image height direction caused by the optical characteristic in an image and the inflection point as correction data shift from each other. As a result, it is conceivable that insufficient or excessive correction occurs around the inflection point and an image provides a sense of discomfort. On the other hand, in a case where correction data that has no inflection point is set to the second data group, even if the inflection point in the image height direction due to the optical characteristic generated in an image is moved, the inflection point is not located on the correction data side and thus excessive correction can be restrained.

Similarly, the second data group may be set to a data group having fewer sharp correction-value changes in a focal length direction of a zoom lens than the first data group illustrating the optical characteristic. That is, a correction-amount change of image data by the second data group to a focal-length change may be smaller than a correction-amount change of the image data by the first data group to the focal-length change.

In a case where there is a large characteristic change in the focal length direction due to a detection delay of the position detecting unit or a delay of optical correction processing, correction shifts according to a zoom operation, that is, it becomes a factor that causes excessive correction. In particular, this phenomenon needs to be considered in the zoom operation during moving image capturing. Thus, excessive correction can be suppressed even during the zoom operation by setting the second data to a correction value in which a large correction-value change in the focal length direction is suppressed.

The second data group may be use correction that incorporates a plurality of ideas among the above ideas. For example, the second data group may be set to data that is made by applying a measure for suppressing a steep correction-value change in the image height direction to data for obtaining the effect of leaving smooth shading in an image. Alternatively, the second data group may be set to data that is made by applying a measure for suppressing a steep correction-value change in the focal length direction to the above resultant data.

A plurality of second data groups may be provided, and the lens apparatus or the image pickup apparatus may be able to select which second data group is to be transmitted. Depending on whether the image stabilizing function of the lens apparatus is turned on or off, it may be selected whether or not to employ correction data for suppressing a steep correction-value change in the image height direction. Depending on whether the image capturing mode of the image pickup apparatus is a still image or a moving image, whether or not to employ correction data for suppressing a steep correction-value change in the focal length direction may be selected.

In each embodiment, the correction is made by the image pickup apparatus, but the disclosure is not limited to this example, and the correction may be made by an external apparatus different from the image pickup apparatus, for example, an image processing apparatus such as a PC.

Each embodiment discusses an example of transmitting correction data to the image pickup apparatus, but the disclosure is not limited to this example, and may transmit the correction data to an external apparatus different from the image pickup apparatus, for example, an image processing apparatus such as a PC, or a data logger that records data by associating an image with correction data.

Each embodiment discusses the correction amount for the light quantity changing amount as a reciprocal of the light quantity changing amount, but the disclosure is not limited to this example, and the same effect can be obtained with a correction value of a different type. For example, regarding a correction value as a coefficient at a current lens position for a predetermined model, both a coefficient as correction data for good correction and a coefficient as correction data in an optical characteristic can be transmitted.

Each embodiment discusses peripheral light quantity correction as an example of optical correction (correction of image data), but the disclosure is not limited to this example, and for example, the disclosure is appliable to correction of lateral chromatic aberration or correction of distortion. That is, the correction of image data relates to at least one of peripheral light attenuation, distortion, and lateral chromatic aberration of an image captured by an image pickup apparatus.

In the lateral chromatic aberration correction, excessive correction gives a sense of discomfort in an image more strongly than correction residue. It is thus conceivable that correction data for correction allows correction residue to some extent and needs to be set to data that does not cause excessive correction under imaging conditions that can be estimated. In the distortion correction, pincushion distortion gives an uncomfortable image more strongly than barrel distortion, and it is thus conceivable that correction data provides a little barrel distortion so that pincushion distortion does not remain in a corrected image under imaging conditions that can be estimated.

Similar to peripheral light quantity correction, the second data group can provide similar effects regarding the measure for suppressing a steep correction-value change in the image height direction and a measure for suppressing a steep correction-value change in the focal length direction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an accessory, an image pickup apparatus, an imaging system, an accessory control method, and a storage medium, each of which is advantageous, for example, for acquiring a desired image through proper optical correction according to a situation or an application.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-195249, filed on Dec. 1, 2021, which is hereby incorporated by reference herein in its entirety.

What is claimed is:

1. An accessory attachable to and detachable from an image pickup apparatus including an image sensor, the accessory comprising:
a memory storing:
first data indicating a first characteristic for correcting image data obtained by the image pickup apparatus; and
second data indicating a second characteristic different from the first characteristic for correcting image data obtained by the image pickup apparatus, wherein the second characteristic corresponds to a combined characteristic of:
an optical characteristic of the accessory; and
a characteristic of the image pickup apparatus; and
a processor configured to control a communication unit to transmit to an external apparatus both of:
first information based on the first data; and
second information based on the second data,
wherein the first information includes values of a first value of a focus position, a second value of a zoom position, and a third value of an aperture position associated with the first data,
wherein the second information includes the same values of the first value of the focus position, the second value of the zoom position, and the third value of the aperture position associated with the second data,
wherein the first information and the second information are in a same data format, and
wherein a correction amount of the image data by the second data is smaller than a correction amount of the image data by the first data.

2. The accessory according to claim 1, further comprising:
an optical element; and
an information generator configured to generate:
the first information based on the first data, the first value of the focus position, the second value of the zoom position, and the third value of the aperture position; and
the second information based on the second data and the first value of the focus position, the second value of the zoom position, and the third value of the aperture position.

3. The accessory according to claim 1, wherein a change in a correction amount of the image data by the second data to a change in an image height is smaller than a change in a correction amount of the image data by the first data to the change in the image height.

4. The accessory according to claim 1, wherein a change in a correction amount of the image data by the second data to a change in a focal length is smaller than a change in a correction amount of the image data by the first data to the change in the focal length.

5. The accessory according to claim 1, wherein the correcting of the image data relates to at least one of relative illumination, distortion, or chromatic aberration of magnification of an image picked up by the image pickup apparatus.

6. The accessory according to claim 1, wherein the processor controls the communication unit to transmit one of the first data or the second data.

7. The accessory according to claim 1, wherein the processor controls the communication unit to transmit a set of the first data and the second data.

8. The accessory according to claim 1, wherein the accessory is a lens apparatus.

9. The accessory according to claim 1, wherein:
the accessory is an adapter attachable and detachable between the image pickup apparatus and a lens apparatus, and
the first data relates to an optical characteristic of the accessory and an optical characteristic of the lens apparatus.

10. The accessory according to claim 1, wherein:
the accessory is a lens apparatus attachable to and detachable from the image pickup apparatus via an adapter, and
the first data relates to an optical characteristic of the accessory and an optical characteristic of the adapter.

11. The accessory according to claim 1, wherein the external apparatus is the image pickup apparatus.

12. An image pickup system comprising:
an image pickup apparatus; and
the accessory according to claim 1 attachable to and detachable from the image pickup apparatus.

13. The accessory according to claim 1, wherein the first data and the second data, which are stored in the memory, are also in the same data format.

14. An image pickup apparatus to which an accessory is detachably attachable, the image pickup apparatus comprising:
an image sensor; and
a processor configured to:
control a communication unit to receive, from the accessory, in a state where the accessory is attached to the image pickup apparatus, both of:
first information indicating a first characteristic for correcting image data obtained by the image sensor; and
second information indicating a second characteristic different from the first characteristic for correcting the image data obtained by the image sensor, wherein the second characteristic corresponds to a combined characteristic of:
an optical characteristic of the accessory; and
a characteristic of the image pickup apparatus,
wherein the first information includes values of a first value of a focus position, a second value of a zoom position, and a third value of an aperture position associated with the first data, wherein the second information includes the same values of the first value of the focus position, the second value of the zoom position, and the third value of the aperture position associated with the second data, and wherein the first information and the second information are in a same data format; and correct the image data obtained by the image sensor based on at least one of the first information or the second information, wherein a correction amount of the image data by the second information is smaller than a correction amount of the image data by the first information.

15. A control method for an accessory attachable to and detachable from an image pickup apparatus including an image sensor, the control method comprising:

obtaining, from a memory storing first data and second data, at least one of the first data or the second data, wherein:

the first data indicates a first characteristic for correcting image data obtained by the image pickup apparatus; and the second data indicates a second characteristic different from the first characteristic for correcting image data obtained by the image pickup apparatus, wherein the second characteristic corresponds to a combined characteristic of:

an optical characteristic of the accessory; and a characteristic of the image pickup apparatus; and transmitting to an external apparatus both of:

first information based on the first data; and second information based on the second data, wherein the first information includes values of a first value of a focus position, a second value of a zoom position, and a third value of an aperture position associated with the first data, wherein the second information includes the same values of the first value of the focus position, the second value of the zoom position, and the third value of the aperture position associated with the second data, wherein the first information and the second information are in a same data format, and wherein a correction amount of the image data by the second data is smaller than a correction amount of the image data by the first data.

16. A non-transitory storage medium storing a program executable by a computer to execute the control method according to claim 15.

17. An accessory attachable to and detachable from an image pickup apparatus, the accessory comprising:

a memory storing:

first data indicating a first characteristic for correcting image data obtained by the image pickup apparatus; and second data indicating a second characteristic different from the first characteristic for correcting image data obtained by the image pickup apparatus, wherein the first data includes first light quantity correction values for each image height where a focus position is a first value, a zoom position is a second value, and an aperture position is a third value of an optical system, wherein the second data includes second light quantity correction values for each image height where the first focus position is the first value, the zoom position is the second value, and the aperture position is the third value of the optical system, and wherein a correction amount of the image data by the second data is smaller than a correction amount of the image data by the first data; and a processor configured to control a communication unit to transmit to an external apparatus both of:

first information based on the first data; and second information based on the second data.

\* \* \* \* \*